United States Patent

[11] 3,543,828

[72] Inventors  Georges Edouard Yvon Caille
               Colombes;
               Bernard Weben, Montmorency, France
[21] Appl. No. 801,915
[22] Filed     Jan. 29, 1969
               Continuation-in-part of Ser. No. 542,906,
               Apr. 15, 1966, now abandoned.
[45] Patented  Dec. 1, 1970
[73] Assignee  Pneumatiques, Caoutchouc Manufacture Et
               Plastiques Kleber-Colombes
               Place de Valmy, Colombes, Hauts de Seine,
               France
[32] Priority  April 17, 1965, Dec. 9, 1965
[33]           France
[31]           Nos. 13742 and 41653

[54] TIRE WITH A REINFORCED BREAKER LAYER
     7 Claims, 7 Drawing Figs.
[52] U.S. Cl. .................................................... 152/361
[51] Int. Cl. ....................................................... B60c 9/20
[50] Field of Search ............................................ 152/361,
                                                          354, 355, 356

[56]              References Cited
            UNITED STATES PATENTS
2,225,042  12/1940  Elliott............................ 152/356
2,493,614   1/1950  Bourdon......................... 152/361

Primary Examiner—Arthur L. La Point
Attorney—Holcombe, Wetherill & Brisebois

ABSTRACT: In a tire with supple sidewalls and a breaker layer reinforcement consisting of a pair of superposed generally longitudinal cord layers containing cables or wires forming small angles with the equatorial plane of the tire, a cord layer having its cables or wires in a transverse direction is located between the longitudinal cord layers and the carcass of the tire after the curving of the carcass. The width of the reinforcement assembly is approximately equal to the width of the tread surface. The transverse cord layer is relatively rigid and made of two superposed layers of parallel cables or wires at 60° to 90° to the equatorial plane of the tire. The edges of the generally longitudinal cord layers may be staggered and may be reinforced by a subtread of smaller hysteresis than the tread.

TIRE WITH A REINFORCED BREAKER LAYER

This application is a continuation-in-part application of our copending U.S. Pat. application Ser. No. 542,906 filed Apr. 15, 1966 now abandoned.

The invention relates to tires having supple sidewalls and a tread reinforced by an inextensible breaker or belt of the type comprising a pair of superposed layers constituted by textile or metal cables forming small angles with respect to the equatorial plane of the tire and a third layer of cables extending in a substantially transverse direction. This well known type of tire is described for example in United Kingdom Pat. Specification No. 628,060 and United Kingdom Pat. Specification No. 980,265. It is well known now that such a tire has particular qualities with respect to conventional bias tires, especially a greater resistance to wear and a greater stability. There have also been proposed numerous modifications of tires of this type and in particular modifications in which the layer of transverse cables of the belt is replaced either by a continuous layer of plastic material (such as for example in the Specification of French Pat. Nos. 1,229,214, 1,273,185 and United Kingdom Pat. 720,150), or by a layer of rubbery mixture with a high modulus of elasticity or containing dispersed fibres (such as for example in U.S. Pat. No. 2,811,998 or French Pat. Specification Nos. 1,234,588, 1,259,709, 1,281,719, 1,305,692, 1,323,300 and 1,327,811) or even for example by two crossed layers constituted by cables forming symmetrical angles of the order of 45° to 75° (such as for example in the Specification of United Kingdom Pat. No. 944,876, French Pat. No. 1,133,604 and U.S. Pat. Ser. No. 3,166,113. Proposals have also been made to eliminate the transverse-directional layer of the belt, the reinforcement thus being reduced to one or more pairs of layers all constituted by cables oriented along small angles, of the order 20°, with respect to the equatorial plane (see for example French Pat. Specification No. 1,122,125.

The majority of these prior proposals have not led to completely satisfactory products either because certain materials such as the layers of plastic material, do not adhere sufficiently well to the surrounding rubber, or because the hard mixture reinforced with discontinuous fibres are difficult to work with. In the other types of constructions which have been manufactured on an industrial scale, the results are quite satisfactory so long as tires of moderate dimensions are used (i.e. passenger car tires), but in large tires for trucks and other similar vehicles, there is often premature loosening at the edges of the reinforcing belt layers. It is probable that one of the causes of this defect resides in the relative movements which are produced at the edges of the breaker layers following the change of the transverse curvature of the reinforcement when it passes into the zone where the tire makes contact with the ground.

It is an object of the invention to avoid or considerably reduce this defect and to this end, it proposes, in a tire having supple sidewalls and an inextensible breaker reinforcement or belt comprising at least one pair of layers of cables forming small angles and a third layer of transverse-directional cables, the improvement consisting in that this third layer is itself constituted by at least two superposed layers of substantially similar width of closely laid, parallel cables or wires extending in the same general transverse direction with respect to the equatorial plane of the tire and of width bearing a defined relationship with the tire tread width. These two superposed layers do not tend to nest and together give, by a girder or I-beam effect, a considerable resistance to the variation of the transverse curvature of the breaker layer reinforcement when the tire is subjected to a vertical crushing load or flexion on the ground. This rigidity brings about in the tire during use, a reduction of the relative movements of the ends of the cables situated at the edges of the breaker layer reinforcement and delays, to quite a considerable extent, the appearance of loosening at this spot.

The construction according to the invention is thus particularly important for tires of large dimensions intended for heavy vehicles, that is to say where the previously known construction prove to have insufficient strength.

Other objects of the invention are certain improvements which experiments have shown to enhance the effectiveness of the above-defined construction. These improvements consist in features known per se but which, in association with the feature of the highly rigid layer formed by transverse cables or wires according to the invention, permit the assembly of the breaker layer reinforcement and the tire which it reinforces, to respond even better to the requirements of use.

In order that the invention may be more clearly understood, reference will now be made to the accompanying drawings which show several embodiments thereof by way of example, and in which.

Figure 1:
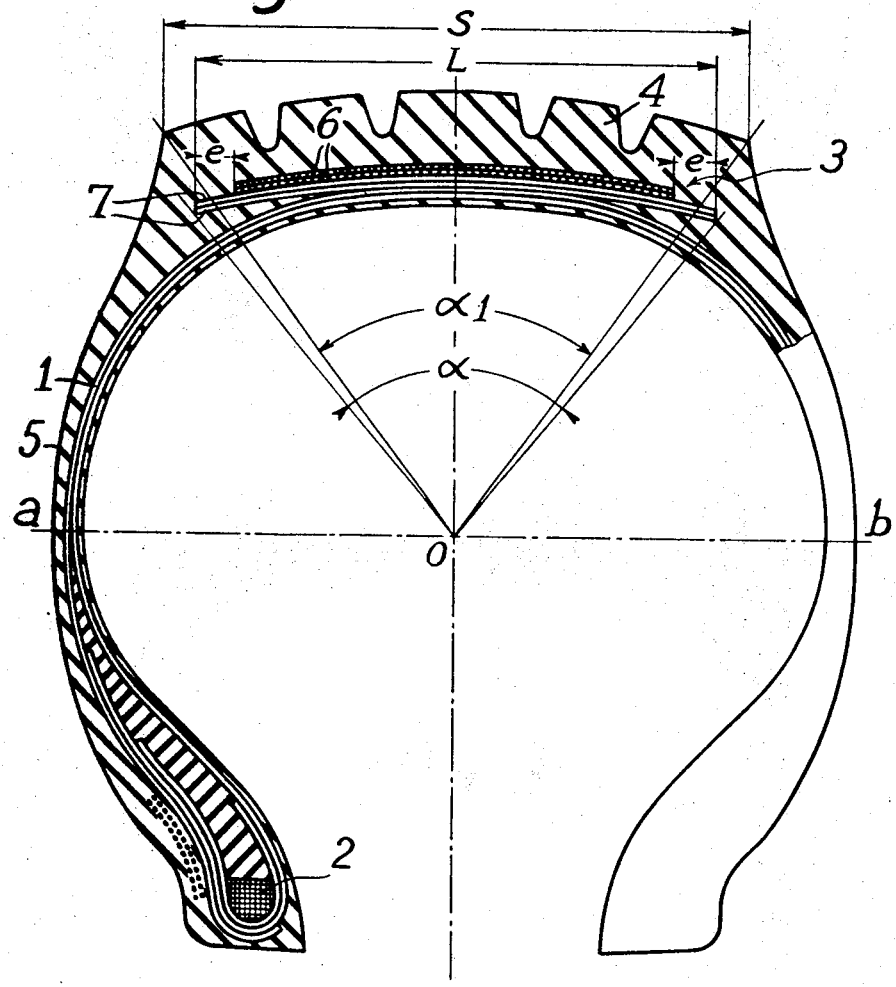
FIG. 1 shows a transverse section of the outer cover of a tire according to the present invention.
Figure 5:
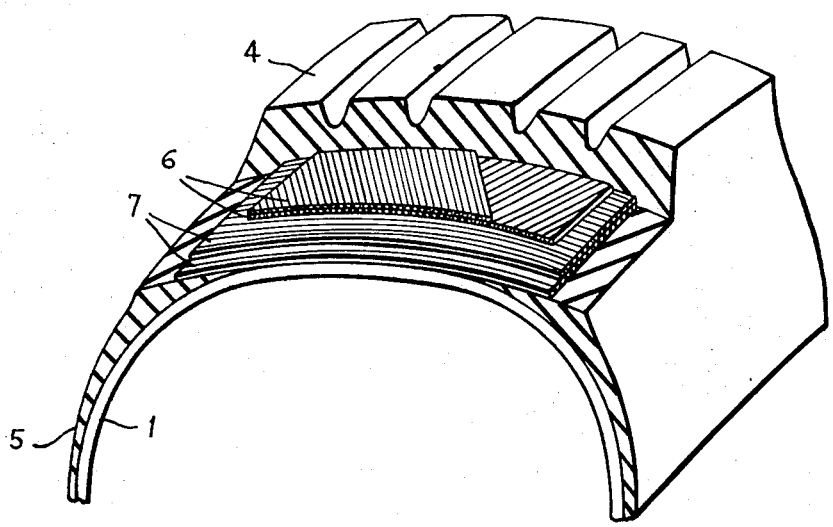
FIG. 5 shows in transverse, stepped section the outer part of the embodiment of FIG. 1.

Referring now to the drawings, the tire shown in FIGS. 1 and 5, comprises a conventional carcass 1 secured to metal wires 2 forming the beads, an inextensible breaker reinforcement or belt 3, a tread 4 and sidewalls 5. The tread may for example have a conventional design zigzag grooves.

The carcass 1 includes, according to the dimension of the tire, one or more layers of parallel cord fabric, each layer composed of textile cords or metal wires or cables oriented along meridian planes in order to form a tire having supple sidewalls. The breaker reinforcement or belt 3 itself comprises one or more pairs of layers of textile or metal parallel cord fabric 6 the wires or cables forming these layers 6 being oriented symmetrically to form a small angle with respect to the equatorial plane of the tire, i.e. an angle which is generally smaller than 20° and preferably between 6° and 15° in the finished tire.

According to the invention, the breaker or belt 3 comprises in addition a highly rigid layer located on the previously curved carcass 1 and constituted in the example shown in FIG. 1 by at least two layers 7 each of which is of conventional cord fabric formed by parallel and closely laid wires or cables oriented substantially transversely, i.e. forming with the tire equatorial plane an angle of the order of 60° to 90°. These two or more layers 7 are placed directly on one another so that their cables are separated only by the very thin layer of rubber with which the layers of cables are generally coated. In addition, the layers 7 are placed so that their cables are oriented at substantially the same angle, i.e. without crossing from one layer to another. This superimposed arrangement of the two transverse layers 7 is shown more clearly in FIG. 6; it is formed in the following manner. In the previous processes of manufacture generally used for conventional bias carcass tire, called the "flat band method," the carcass is first of all built on a cylindrical drum having substantially the diameter of the beads 2 and the tread stock is applied on the carcass as the first phase of the process. The complete tire being removed from the building drum, the second phase is then to expand the complete tire into semitoroidal shape. This second phase may be done with a shaping apparatus or even in the mold apparatus. On the other hand to form the tire according to the present invention, following the building of the carcass, the said carcass is then curved to take up a substantially semitoroidal shape before receiving the belt 3 and the tread 4. The belt 3 being thus placed at the top of the carcass after curving the latter, the result is that the layers 6 and 7 of the belt 3 are not subjected to radial expansion and to circumferential extension given to the carcass during the operation of shaping. In consequence, the layers 7 of the belt preserve in the finished tire the superposed arrangement which they are given at the moment of placing these layers on the top of the carcass. The final operation of moulding and of vulcanization of the tire does not modify in appreciable manner, such as by stretching or nesting, this superposed arrangement of the layers 7.

In the above-described construction according to the invention, the two layers 7 together, due to their proximity and to the same transverse orientation of their cables, offer a considerable resistance to the radial efforts of flexion which tend to modify the transverse curvature of the breaker reinforcement. This resistance probably reduces the relative movements of the cables at the edge of the layers. Be that as it may, experiments show the construction of the breaker reinforcement according to the invention permits the appearance of loosening at the edges of the breaker layers to be considerably delayed.

The transverse rigidity of the breaker obtained by the superposed layers 7 may obviously be determined according to need by suitably choosing the nature of the materials, i.e. by taking for the layers of the breaker or belt textile or metal cables, wires or monofilaments. This transverse rigidity may even be adjusted by using a reasonably hard rubbery mixture for coating the wires or cables of the layers of the breaker 3. Good results have been obtained most particularly with breaker layers 7 composed of metal cables calendered in a rubbery mixture having a Shore A hardness of the order of 80.

Figure 6:
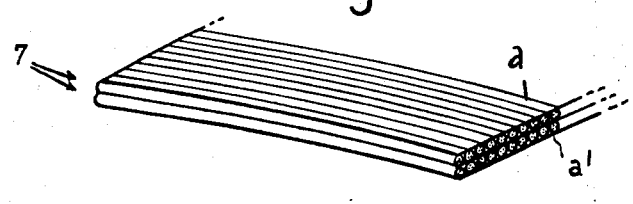
FIGS. 6 and 7 illustrate on an enlarged scale an element of FIG. 5 which is an important feature of the invention.
Figure 7:
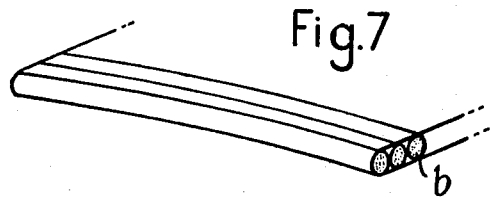

The element 7 shown in FIG. 6 has been found by experiment to be much less satisfactory if the two layers of the cables $a, a'$ are replaced by a single layer of cables $b$ having a twice larger diameter as in FIG. 7. Such a single layer of large cables is difficult to manipulate and slows down production, besides it has a lower density per unit of circumferential length and so the assembly has less resistance to flexion.

Also from the theoretical point of view, it can be considered that in the two layers 7, each pair of superposed wires $a$ and $a'$ is similar to a restrained beam, having a great resistance to flexing. In fact the moment of inertia of two adjacent pairs of cables such as $a$ and $a'$ with respect to the neutral axis located in the intermediate plane of the layers 7 is obviously greater than the moment of inertia of a single large cable $b$ with respect to its axis, in a single layer 7.

The two transverse-directional layers 7 have substantially the same breadth L determined so that, seen in the transverse section of the tire (FIG. 1), these layers 7 are included in an angle $\alpha$ at the centre which is greater than the angle $\alpha$, at the centre in which is included the breadth S of the tread surface of the tire. The centre O of the section of the tire is situated at the intersection of the vertical axis passing through the equatorial plane with the line $ab$ situated in the plane of the largest width of the tire section. The layers 7 thus extend into the region of the shoulders of the tire. However, the breadth L of the layers 7 must not be much greater than the breadth S of the tread surface. It must not exceed 105 percent of S, and may be as little as 85 percent of S.

It is also preferable that the layers 7 be a little wider than the longitudinal-directional layers 6 for the edges of the latter to be "shrunk" with respect to the edges of the former and it has been found that better results are obtained when the distance $e$ between the edges of the layers 6 and 7 is at least 15 mm.

Another feature consists in utilizing, for calendering the layers of cables 7, a rubbery mixture having a relatively small hysteresis even if this mixture does not have a very considerable hardness (about 65°—70° Shore A). It seems preferable to use, for calendering the other layers 6 of the breaker, fairly hard rubbery mixtures (of the order of 80° Shore A) even if this must lead to mixtures of a greater hysteresis.

Figure 3:
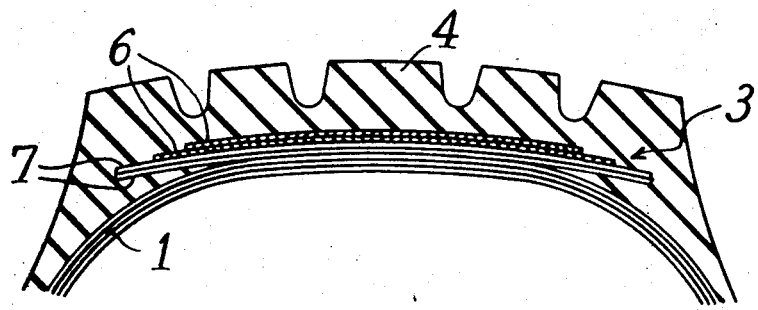
FIG. 2, 3 and 4 are partial views in transverse section respectively illustrating modifications of the invention as exemplified in FIG. 1.
Figure 2:
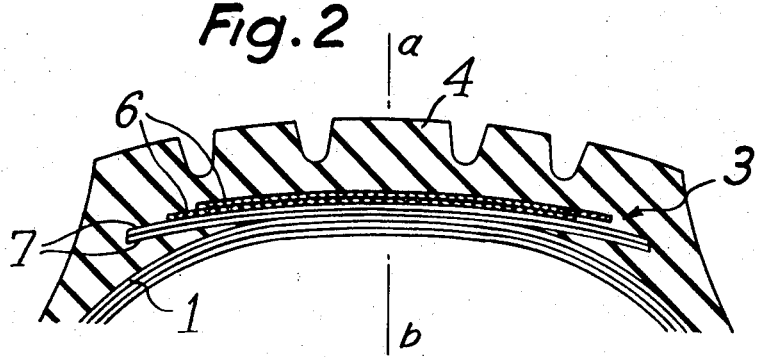

FIGS. 2 and 3 show embodiments of the invention, which may also include one or more of the above-described features. and in which respectively (a) the layers 6 are mutually laterally shifted offset (FIG. 2), all the layers having the same breadth, and (b) layers 6 are of decreasing breadth (FIG. 3) in order that, in both cases, the edges of the layers 6 are arranged in tiers in a manner more favorable for obtaining a good resistance to loosening and to the starting of possible loosening.

In another modification applicable to the above-described embodiments, the layers 7 of the same transverse direction (or at least one of the layers 7) have cables or wires which are individually stronger, i.e. larger and/or stiffer than the cables or wires constituting the layers 6 for the purpose of increasing the stiffness of the reinforcement and its resistance to the efforts of flexion, tending to modify its transverse curvature. By way of indication if breaker layers 6, composed of metal cables with 38 wires with a diameter of 0.15 mm., are normally used for a specific tire, metal cables constituted by 7 strands of seven wires with a diameter of 0.17 mm., i.e. larger and stiffer against flexion, can be used for the layers 7.

The superimposed layers 7 may be constituted by weftless fabrics having very closely juxtaposed cords resistant to nesting of contiguous layers on superposition.

Another improvement consists in placing beneath the tread 4 a "subtread" 9 covering at least the external edges of the layer 6 and 7 of the breaker reinforcement 3, this subtread being composed of a rubbery mixture with a smaller hysteresis than that of the actual tread in order to reduce heating near the breaker reinforcement during use.

Figure 4:
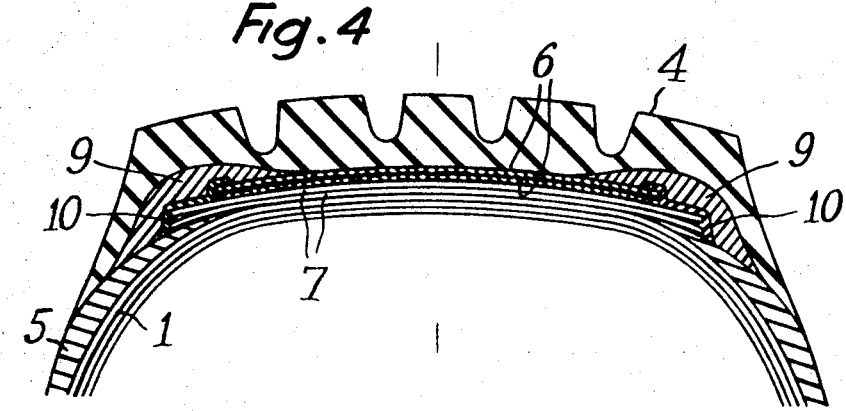

By way of indication, the rubbery mixture constituting the subtread 9 advantageously has a rise in temperature $\Delta T$ of the order of 5° to 10° whilst the rubbery mixture utilized for the tread proper has a $\Delta T$ of 10°—15° when these mixtures are subjected to a heating test with the Goodrich Flexameter defined in the American standard ASTM D623/58 (method A). In FIG. 4, this subtread 9 is composed of two parts, each covering an edge of the breaker reinforcement and whose thickness decreases progressively in order to be secured to the sidewalls 5 and to the external surface of the reinforcement 3. However, these two parts could be connected to one another by a layer of the same rubbery mixture covering the central part of the reinforcement 3. Before placing the subtread in position, the edges of the layers of the reinforcement may be covered by narrow strips of rubber 10 composed of a mixture similar to that used for calendering the layers 6 and 7.

The invention is not limited to a the above-described embodiments which may be modified in various ways. For example, the number of layers 7 with transverse cables may be greater than two, particularly in the case of tires of large dimensions. Moreover, the tire may obviously be different in those parts not directly concerned with the invention. All such changes and modifications are regarded as within the scope of the invention as defined by the appended claims.

We Claim:

1. angles a tire with supple sidewalls and a breaker layer reinforcement comprising at least one pair of superposed generally longitudinal cord layers each constituted by cables or wires forming small angles not exceeding 20° with respect to the equatorial plane of the tire, the cords of one layer extending in a different direction to the direction of cords in the other layer, and a layer of transverse-directional cables or wires positioned between said longitudinal-directional layers and the carcass of the tire, the said reinforcement having a transverse dimension approximately equal to the width of the tread surface, the improvement which consists in that the layer of transverse-directional wires or cables is a relatively rigid layer and constituted by at least two superposed layers applied on the semitoroidal shaped carcass, all the cables or wires of said superposed layers being parallel and having the same general transverse direction forming an angle of 60° to 90° with respect to the equatorial plane of the tire, and said cables or wires having substantially the same axial width which subtends an angle at the centre of the tire radial cross section greater than the angle subtended at the centre of the tire radial cross section by the axial width of the tread surface, this width however not greatly exceeding the width of the tread surface.

2. A tire according to claim 1, wherein at least one of the two superposed layers of cables or wires of the same transverse direction is constituted by cables or wires which are individually stronger than the individual wires or cables of said generally longitudinal cord layers of small angle.

3. A tire according to claim 1, wherein said generally longitudinal reinforcing layers constituted by slightly inclined cables or wires are narrower so that their edges are inwardly shrunk by at least 15 mm. with respect to the edges of said transverse layers.

4. A tire according to claim 3, wherein said generally longitudinal reinforcing layers are narrower and are mutually laterally shifted in order that their edges are arranged in tiers.

5. A tire according to claim 3, wherein said generally longitudinal reinforcing layers have decreasing breadths in order that their edges are arranged in tiers.

6. A tire according to claim 3, wherein said generally longitudinal reinforcing layers are calendered with a relatively hard rubbery mixture having a hardness of the order of 80° Shore A.

7. A tire according to claim 1, which comprises a subtread covering at least the sides and the external marginal edges of the breaker layer reinforcement, said subtread being composed of a rubbery mixture having a smaller hysteresis than the mixture constituting the tread.